Sept. 21, 1965  R. P. WILLIAMS  3,207,606
CONTINUOUS FERMENTATION PROCESS FOR BEER PRODUCTION
Filed Oct. 28, 1963  2 Sheets-Sheet 1

INVENTOR:
REES P. WILLIAMS

Sept. 21, 1965  R. P. WILLIAMS  3,207,606
CONTINUOUS FERMENTATION PROCESS FOR BEER PRODUCTION
Filed Oct. 28, 1963  2 Sheets-Sheet 2

INVENTOR:
REES P. WILLIAMS

United States Patent Office 3,207,606
Patented Sept. 21, 1965

3,207,606
CONTINUOUS FERMENTATION PROCESS FOR BEER PRODUCTION
Rees Philip Williams, London, England, assignor to R. Ramsden & Son Limited, Darlington, and Charrington & Company Limited, London, England, both corporations of Great Britain
Filed Oct. 28, 1963, Ser. No. 319,103
8 Claims. (Cl. 99—31)

This is a continuation-in-part of my co-pending United States patent application Serial No. 107,879 filed March 24, 1961, now abandoned.

This invention relates to the manufacture of beer, and more particularly to the fermentation of "Brewers Wort."

In the production of beer, the basic ingredients are malt, water and hops, and yeast is added to obtain the fermentation.

The malt is ground and mashed with hot water, and enzymes in the mash then convert the starch content thereof into sugars and carbohydrates so that the resulting liquid wort contains proportions of fermentable and unfermentable extracts from the ground malt.

This wort is then passed to a boiling apparatus in which it is boiled with hops and this results in sterilisation of the liquid, extraction of various flavour and aroma substances from the hops, concentration of the wort, and destruction of any remaining enzymes in the liquid.

The wort obtained is then separated from any solids and is cooled. The cooled wort is then passed to a fermenting apparatus in which yeast is added, and it is with this stage that the present invention is concerned. The yeast grows and at the same time gives rise to fermentation of the wort. Upon completion of the fermentation, the remaining liquid is then "beer" and it is cooled and allowed to settle in a storage plant. The yeast produced may be removed from the surface of the liquid in the fermentation vessel and may be pressed so as to obtain any remaining liquid which can be added to the beer produced. The fermentation takes place in a first phase of growth of the yeast and commencement of the fermentation, a second phase of continuance of the fermentation, with evolution of carbon dioxide, followed by a climax of fermentation and yeast growth. During this time the yeast either rises to the surface of the liquid in so called "top" fermentation, or settles to the bottom of the liquid in so called "bottom" fermentation, this being determined by the nature of the yeast selected.

In top fermentation, the yeast is of a particular kind which rises to the top of the liquid, e.g., *Saccharomyces cereviseae*, and forms a head which can be skimmed off continuously or at intervals. In bottom fermentation, the yeast is of another kind, e.g., *Saccharomyces karlsbergensis*, which sinks in the liquid and which is normally removed from the base of the fermenting vessel by a sludge pump.

Top fermentation is normally used for the production of relatively heavier ales and beers, and bottom fermentation is used for production of relatively lighter lager type beers. Normally top fermentation is carried out within a somewhat higher temperature range than bottom fermentation.

Hitherto the fermentation of the wort has traditionally been carried out on a batch system. The mixture of wort and yeast was placed in a fermenting vessel and allowed to remain for a period of two to three days, as required by the particular yeast being used, after which the yeast head was removed and the liquid drawn off as fermented beer. The time required for each of the phases of fermentation could not be varied except within relatively very narrow limits, and although some variation was obtainable by changing the temperatures, any very great change of temperature was detrimental to the fermentation process and did not result in production of a palatable beer. Accordingly, by the traditional method, the production of for example 168 barrels of beer necessitated the use of a vessel of that volume which could be used effectively only once per week and which required thorough cleaning between each time of use.

The present invention stems from the discovery that a continuous through flow of liquid is compatible with a sufficient period of dwell time in each phase of fermentation to enable that phase to be carried out in isolation from the other phases, and the object of the present invention is to provide a process for the continuous fermentation of wort, with the attendant advantages of relatively smaller vessels and a higher production rate.

The dwell times of the process of the present invention are so chosen as to be comparable with the same periods which would be used in the conventional batch method and apparatus for fermentation. It has been found that by careful choice of the comparative dimensions of the vessels used, the dwell times of each phase may be made to correspond to those which would occur in the batch method. Heating and cooling means are provided for the vessels and these allow the same small variations of temperature to be obtained as might be used in the batch method to suit the requirements of various types of wort and yeast made use of. Similarly, provision is made for either rousing or slowing down the first phase of yeast growth and, as in the batch system, the rousing may be carried out by either agitation or by the introduction of oxygen-containing gas into the mixture. Slowing down of the yeast growth may be carried out by passing nitrogen or carbon dioxide through the mixture. Normally, the rousing would preferably be carried out mechanically, but the use of oxygen is commonly provided as an alternative in the event of breakdown of mechanical stirring means.

The process of the present invention makes use of the same materials and the same times and temperatures as are used in the conventional batch processes, but with the advantage that there is a continuous through flow of the materials from one end of the apparatus to the other.

This continuous through flow has very considerable advantages. Firstly, it is relatively simple to make the apparatus in a closed state so that once it has been rendered sterile, and if sterile materials are used to feed it, there is no further possibility of infection arising. The apparatus can be used continuously for relatively long periods so that cleaning operations are reduced. The beer produced can be checked and correction of activity and temperature can be introduced while the process is in action. Above all, relatively very much less space is required for a continuous flow apparatus to produce for example 168 barrels of fermented beer in one week.

The process accordingly comprises a first step of continuously forming in a first phase a mixture of sterile wort and yeast and keeping said mixture at a temperature and for a period of time both selected to ensure yeast propagation and the onset of fermentation of the wort; a second step of passing the resultant mixture continuously to a second phase and keeping the mixture at a temperature and for a period of time both selected to ensure completion of the fermentation; and a third step of continuously passing the fully fermented wort to a third phase in which it is allowed to settle.

The process does not involve a new kind of fermentation with novel stages of working or novel chemical reactions. On the contrary, the conventional reactions are carried out with the conventional materials for the conventional periods of time allowed in batch operation, but the entire process is carried out with continuous through flow. It has not hitherto been suggested in the art to select comparative volumes for the vessels to give the required relative dwell times for the various phases of fermentation. It is well known to those skilled in this art that the times and temperatures of the conventional operation cannot be altered to any great extent and it is probable that batch operation has continued to be used for fermenting the wort, in spite of the inherent disadvantages of batch operation, because it was not throught possible to carry out the process as a continuous process.

During the active fermentation phase a yeast head is produced and this head may be continuously removed together with a small content of wort, this fully fermented wort being separated and passed to the third phase for settling.

It is preferred to arrange that the entire flow occurs by gravity through vessels arranged in series at progressively lower levels.

Where a relatively longer dwell time of the liquid in any vessel is desired, the cross-section of that vessel is proportionately increased. By varying the size and cross-section of the vessels, the apparatus and process can be adjusted to suit the natural characteristics of the particular yeast which the brewer wishes to use.

In order that the nature of the invention may be readily ascertained, two embodiments of apparatus respectively suitable for so-called top fermentation and bottom fermentation, and the manner in which they may be used in accordance with the invention, are hereinafter particularly described by way of example with reference to the figures of the accompanying drawings, wherein:

FIG. 3 is a partial vertical section, on an enlarged scale, of a detail of a modification applied to the third vessel of FIG. 1.

Figure 1:
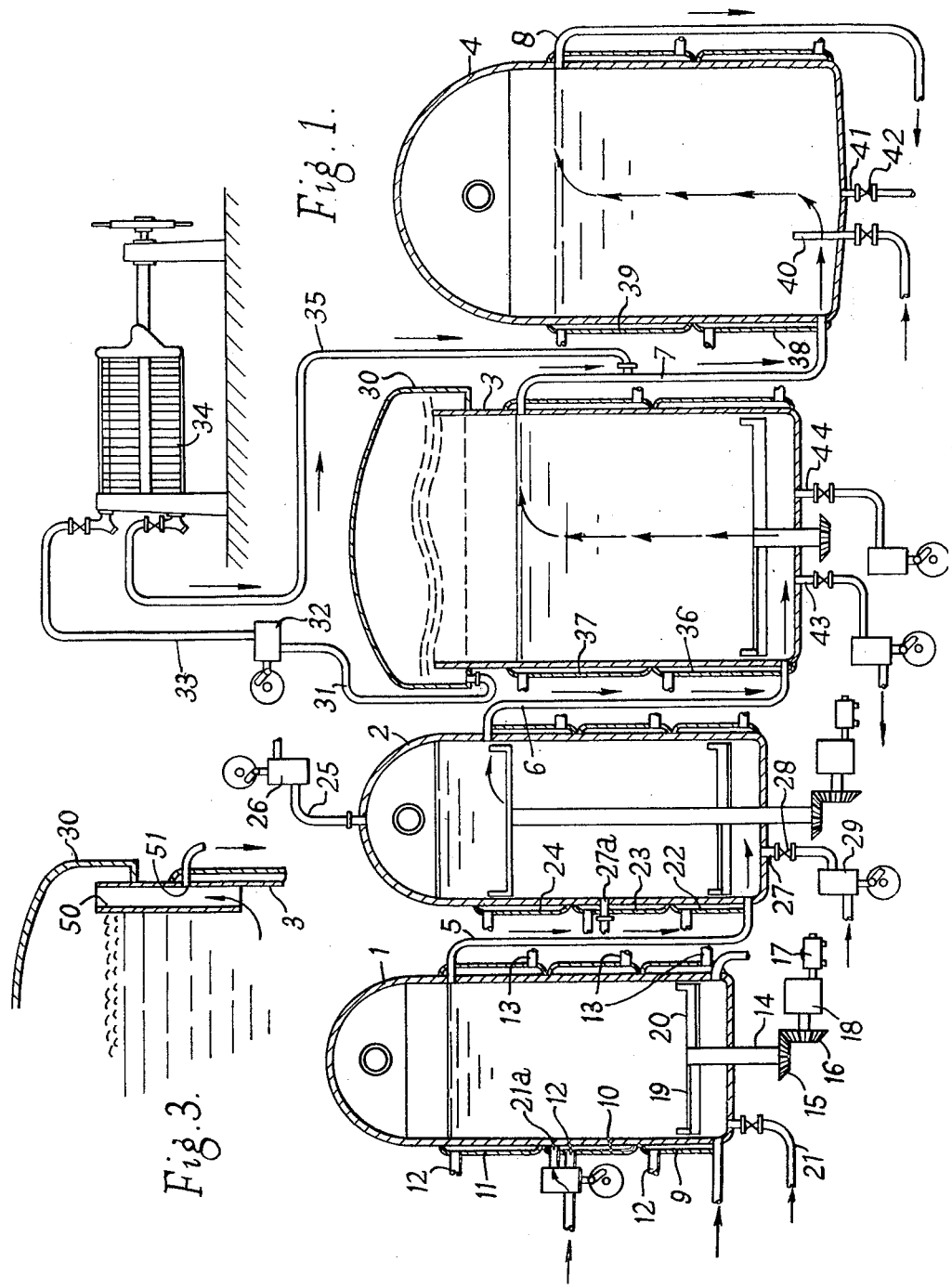
FIG. 1 is schematic vertical section of a first embodiment of fermentation apparatus, suitable for top fermentation, e.g. of relatively heavy beers.

Referring to FIG. 1, the apparatus includes four upright cylindrical vessels 1, 2, 3 and 4 arranged in descending order of levels, vessels 1, 2 and 3 each having their upper part connected to the lower part of the next succeeding vessel respectively by the conduits 5, 6 and 7. An outlet at the upper part of the last vessel 4 is connected by a conduit 8 to any convenient pumping means (not shown) for transfer of the finished product to a suitable place of storage or further treatment.

The first vessel 1 of the series is charged with sufficient yeast according to its capacity. The natural growth of the yeast will eventually ensure that the whole of the system becomes adequately charged, so that this first vessel may be considered also as a yeast culture plant.

Wort from any suitable source enters the lower part of the first vessel 1. The incoming wort mixes with the yeast already in the vessel and slowly travels upwards, during which time it may if necessary be roused mechanically by stirring, or by introduction of oxygen. About the vessel are arranged three separate jackets 9, 10, 11 each having an inlet 12 and an outlet 13 whereby any convenient liquid or gaseous heating or cooling medium can be passed through these jackets independently of each other to permit, within the narrow limits permissible, the raising or lowering or stabilisation of the temperature of the liquid in the vessel at three major levels thereof.

Within the vessel 1 is disposed a shaft 14 driven at a suitable slow speed through bevel pinions 15, 16 by a motor 17 acting through a speed-reducing gear-box 18, the shaft carrying a pair of inclined impeller blades 19, 20 at its lower part to urge the liquid upwardly in the vessel and cause a general circulation from bottom to top, i.e., for "rousing" the yeast growth.

In the base of vessel 1 is provided an inlet conduit 21 through which nitrogen or carbon dioxide gas may be introduced, if necessary, for the purpose of slowing the yeast growth. Another pressurised gas inlet 21a is provided at an intermediate point up the vessel 1 for the introduction of air or oxyen for "rousing," i.e., boosting the fermentation.

The wort is fed into vessel 1 at a temperature of about 70° F. Fermentation commences and in this vessel a first head of yeast is produced at the top end. This liquid passes by gravity through the conduit 5 to the lower end of vessel 2. This vessel also has independently operable jackets 22, 23 and 24 at three levels, and is of slightly greater volume than vessel 1. When the liquid has entered vessel 2, and whilst it passes slowly upwards therein, the fermentation continues at a rapid pace and carbon dioxide gas is given off, this being drawn off at the upper end of the vessel through a conduit 25 connected to any suitable suction device represented in this instance as a simple pump 26. As a result of this further fermentation, the yeast produces, on the surface of the liquid, what is known in the art as a "rocky head." During passage of the liquid from bottom to top of vessel 2 there has been a steady fall in gravity. Liquid from the top end passes by gravity through the conduit 6 to the lower end of vessel 3. The bottom end of vessel 2 is likewise provided with an inlet conduit 27, valve 28 and representative pressure pump 29 for feeding in gas such as nitrogen if the action occurring in the mixture should require slowing. A pressurized gas inlet 27a is provided at an intermediate point up the vessel 2 for entry of air or oxygen if the fermentation should require boosting.

Vessel 3 is made of considerably larger cross-section than vessels 1 and 2, whereby the dwell time therein is appropriately increased. Vigorous fermentation occurs in this third vessel, together with the climax of yeast production, and a further fall in gravity. A further yeast crop is produced and a head is formed at the surface of the liquid. The upper end of the vessel is provided with an annular tray 30 into which the yeast head, containing a small content of fully-fermented wort, can pass and from which it is removed, through a conduit 31 by any suitable suction device, represented in this drawing as a simple suction pump 32. Alternatively, the yeast could be removed by mechanical means. The collected yeast can then be treated in the orthodox manner for resale, it being emphasized that no further yeast need be added to the system at all. The yeast head, plus its small content of wort, passes through a conduit 33 to a yeast press 34 which serves in well known manner to (a) compress the yeast for re-use, and (b) separate the traces of wort from the yeast, this separated wort being fed into the third phase of the system through a conduit 35.

Vessel 3 has two independently operable jackets 36, 37 by means of which the temperature of the liquid can be controlled, within the narrow limits permissible, at two major levels.

The temperature of the liquid immediately below the yeast head in vessel 3 is approximately 70° F., and this liquid is passed by gravity through conduit 7 to the bottom of vessel 4.

FIG. 3 shows, to a larger scale, a baffle device which can be applied at the outlet of vessel 3. This baffle consists of a vertical half-cylindrical plate 50 which is secured opposite the outlet opening 51 and has its lower end immersed in the liquid and its upper end extending beyond the maximum height of the yeast head. The action of this baffle is to prevent the yeast head from being taken out through the outlet by the normal flow of liquid, whilst at the same time a very small proportion of yeast in suspension (about 1%) is carried over to the fourth vessel in the liquid which passes out through the outlet. This is comparable with the result obtained in the existing batch systems.

Vessel 4 is a cooling and settling vessel in which the third phase occurs, and it has independently operable jackets 38 and 39 for temperature control. At the lower part of vessel 4 is provided an inlet conduit 40 through which carbon dioxide gas may be introduced, from any suitable pressure source, at a pressure of say two pounds per square inch; this serving both to ensure complete absence of air and to slightly carbonize the beer. Settling and clarifying of the beer takes place in vessel 4, and an outlet conduit 41 with valve 42 is provided at the base of the vessel for connection to a sludge suction pump (not shown).

The beer passes up vessel 4 and is eventually drawn off through conduit 8, which leads it to any suitable storing or conditioning means as desired.

The jacketing of the four vessels enables complete thermal control to be obtained, i.e. either cold or heated water can be passed through the independently operable jackets to maintain the fermentation at a predetermined rate, or to lower its speed, as may be required by the brewer.

Any sludge withdrawn from the base of vessel 4 through conduit 41 may be filtered by any known means (not shown) and the reclaimed fully-fermented wort passed back into vessel 4 at an inlet (not shown) part way up that vessel.

Such an apparatus and method is suitable for so-called "top fermentation" wherein the yeast rises to the top of each vessel during the process.

In an example of carrying out the process of the invention, for "top" fermentation, there was utilised a single colony strain of top-fermentation flocculent-type yeast (*Saccharomyces cereviseae*), and the following results were obtained.

TABLE I

*Variation of specific gravity*

| Reading taken during passage of liquid from— | Mean value over whole period | Highest and lowest values |
|---|---|---|
| Vessel 1 into Vessel 2 | 1,035.0 | 1,034.0–1,036.0 |
| Vessel 2 into Vessel 3 | 1,022.0 | 1,021.0–1,024.0 |
| Vessel 3 into Vessel 4 | 1,015.0 | 1,014.0–1,016.0 |

The wort used in this example had an initial specific gravity of 1040.7.

Samples of yeast taken from vessel 1 and vessel 2 were examined under a microscope and it was found that the yeast was healthy and completely free from bacterial infection.

Yeast counts on the worts, issuing from vessels 1 to 4, were as follows:

TABLE II

| Vessel | Yeast Count (cells per millilitre) | Yeast (lbs. per barrel) | Yeast (kilograms per hectolitre) |
|---|---|---|---|
| 1 | 15×10⁶ | 1.5 | 0.42 |
| 2 | 20×10⁶ | 2.0 | 0.56 |
| 3 | 8×10⁶ | 0.8 | 0.22 |
| 4 | 1.5×10⁶ | 0.15 | 0.042 |

The yeast count of $1.5 \times 10^6$ cells per millilitre is the ideal figure for a racking beer under the conventional batch system. The final pH value of the beer obtained was 4.18.

The temperature of the contents of vessels 1, 2 and 3 was maintained at between 70° and 72° F., and the temature of the contents of vessel 4 (the holding vessel) was maintained at 65° F.

TABLE III

The dwell or holding times for the respective vessels were:

| | Hours |
|---|---|
| Vessel 1 | 6.25 |
| Vessel 2 | 21.5 |
| Vessel 3 | 43 |
| Vessel 4 | 43 |

Figure 2:
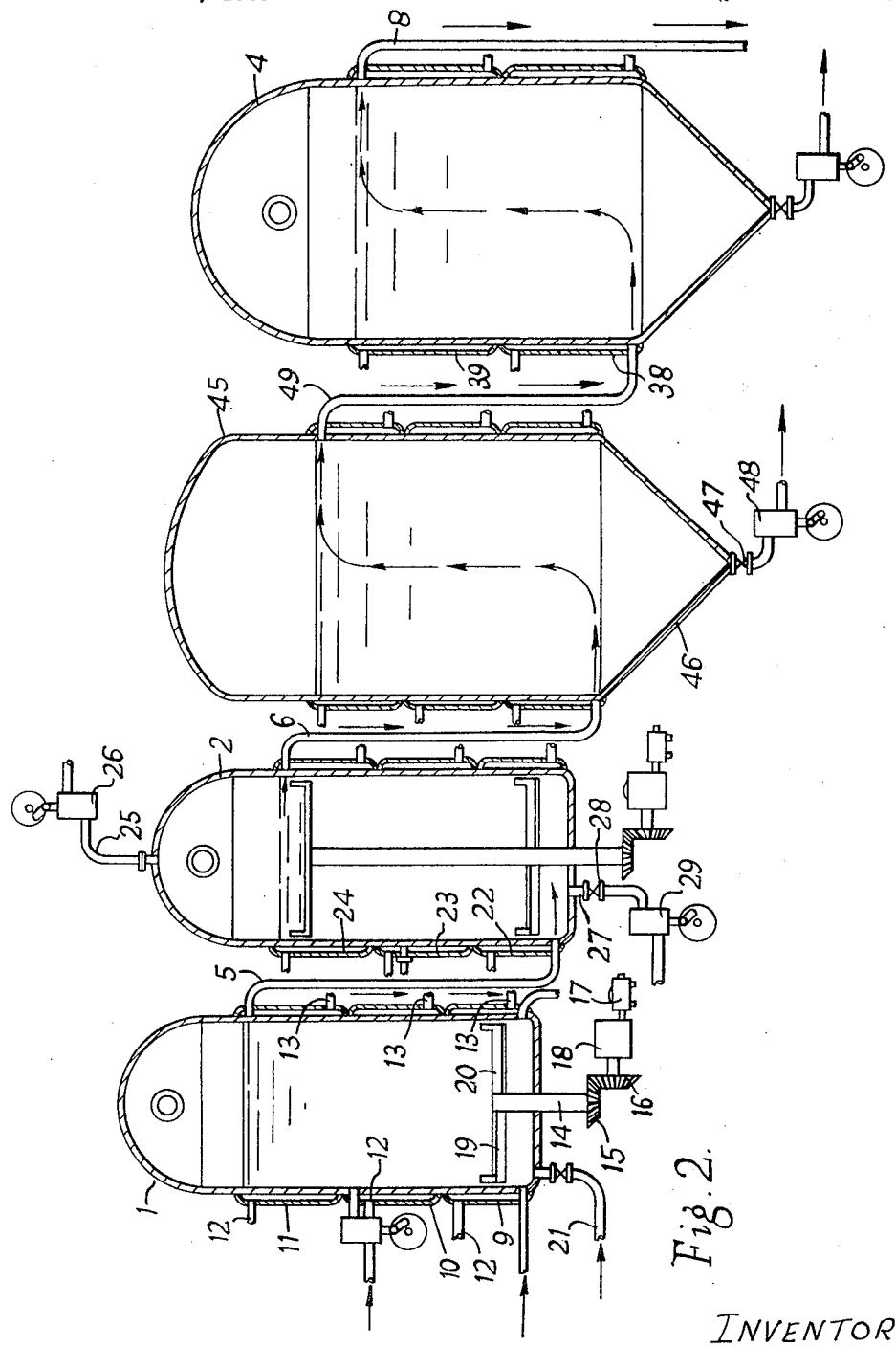
FIG. 2 is a similar illustration of a second embodiment suitable for bottom fermentation of lighter beers, such as "Lager"

Referring now to FIG. 2, there is shown a second embodiment of apparatus which is suitable for so-called "bottom-fermentation," i.e., wherein the yeast is eventually collected, in the third vessel, at the bottom of that vessel instead of at the top end thereof.

The entire apparatus, so far as concerns vessels 1 and 2 and the ancillary apparatus and supplies connected thereto, is identical with that described in relation to FIG. 1. The third vessel 45 however, instead of having a collector tray 30 (see FIG. 1), has a simple closed top and is formed with a conical base 46 which terminates at its bottom end in an outlet valve 47 leading to a suction device represented here by a simple suction pump 48. Vessel 4 likewise has a conical base, and yeast can also be drawn off at the lower end similarly to vessel 3.

Due to the different manner of "bottom" fermentation described below, the gravity of the beer in the vessel 45 is somewhat less than that found in the vessel 3 of FIGURE 1. The yeast sinks in the liquid and collects in cone 46. The yeast, plus a content of fully-fermented wort, is pumped off through the valve 47 and is passed to a yeast press similar to that shown at 34 in FIG. 1. The yeast can be re-used, and the small wort content can be introduced back into the system through an inlet conduit at some suitable point such as part-way up the vessel 45, or in the conduit 49 connecting that vessel to the fourth vessel.

In an example of carrying out the process of the invention for "bottom fermentation," e.g., for the production of larger-type beer, there was used a conventional yeast *Saccharomyces karlsbergensis*, and the following results were obtained:

TABLE IV

*Variation of specific gravity*

The wort used had an initial specific gravity of 1035.0.

| Reading taken in: | Specific gravity, mean or highest and lowest values |
|---|---|
| Vessel 1 | 1034.0 |
| Vessel 2 | 1010–1011 |
| Vessel 45 | 1008–1009 |
| Vessel 4 | 1007–1008 |

TABLE V

Yeast counts of the worts issuing from the vessels were as follows:

| Vessel: | Yeast count in cells per millilitre |
|---|---|
| 1 | ——— |
| 2 | 40×10⁶ |
| 45 | 20×10⁶ |
| 4 (upper layers of contents) | 3×10⁶ |
| 4 (lower layers of contents) | 10×10⁶ |

TABLE VI

The temperature of the wort in the vessels was as follows:

| Vessel: | Temperature, ° F. |
|---|---|
| 1 | 60–65 |
| 2 | 57–58 |
| 45 | 44 |
| 3 | 38 |

The choice of temperature for the introduction of wort into the first vessel can vary. It is found that for the fermentation occurring in the subsequent vessels the effect of temperature upon the rate of lowering of specific gravity is not very pronounced, whereas in the first vessel a change of initial temperature from 50° to 60° has the effect of approximately halving the time taken to obtain the required reduction of gravity in that vessel.

The total drop in temperature occurring during the process serves the dual purpose of both simulating the temperatures used in conventional batch production of lager beer, and of assisting in the natural sedimentation of the yeast.

TABLE VII

The dwell or holding times in each of the vessels were as follows:

| Vessel: | Dwell or holding time, hours |
|---|---|
| 1 | 9.36 |
| 2 | 32.25 |
| 45 | 64.5 |
| 4 | 64.5 |

It will be well known to those skilled in the art of brewing that each yeast has a typical fermentation graph. Accordingly, if necessary, the vessels would in practice be varied in relative size to suit the precise relative dwell times required. Although the rate of flow into a vessel is obviously equal to the rate of flow out of it, the practical effect is a greater or lesser dwell time according as the vessel size is increased or decreased.

Although the apparatus of FIGS. 1 and 2 has been shown as gravity fed throughout, the liquid could be pumped between vessels if required, or the gravity flow could be pump-assisted.

The four vessels of both FIGS. 1 and 2 are shown as being laterally displaced into a side by side position, as well as progressively lowered to provide gravity flow. The four vessels could also be arranged in vertical alignment, e.g. in a stacked formation. Further, where the vessels are arranged in side by side formation, as illustrated, they could be constituted by chambers of a single vessel partitioned off one from the next, or by individual vessels but having common side walls.

Such apparatus has the advantage that, if the plant is made initially sterile and is fed with sterile wort, no infection can take place because the vessels are totally enclosed. The conditions of flow permitting normal fermentation temperatures to be used, and the absence of vigorous rousing, ensures that there is no deficiency in the beer of its flavouring characteristics.

I claim:

1. A continuous process for the fermentation of wort by yeast in the production of beer, by flowing materials at a constant rate from phase to phase through a series of connected tanks having volumes selected in each phase to ensure dwell periods at each phase comparable to dwell periods used in batch operations, including a first step of continuously forming in a first phase a mixture of sterile wort and yeast and keeping said mixture at a temperature and for a period of time both selected to ensure yeast propagation and the onset of fermentation of the wort in a first tank, a second step of passing the resultant mixture continuously to a second phase in a second tank and keeping said mixture at a temperature and for a period of time both selected to ensure completion of the fermentation and recovering yeast therefrom; and a third step of continuously passing the fully fermented wort to a third phase in a third tank in which it is allowed to settle, all of said steps being conducted in a system sealed against infection by external micro-organisms.

2. A continuous fermentation process, as claimed in claim 1, wherein the second phase has two successive stages in the first of which there is vigorous fermentation and in the second of which there is continuance and termination of the vigorous fermentation and climax of the yeast crop production.

3. A continuous fermentation process, as claimed in claim 1, wherein the wort-yeast mixture of the first phase is agitated for rousing of the yeast growth.

4. A continuous fermentation process, as claimed in claim 1, wherein oxygen-containing gas is introduced into the wort-yeast mixture of the first phase for rousing of the yeast growth.

5. A continuous fermentation process, as claimed in claim 1, wherein gas selected from nitrogen and carbon dioxide is introduced into the wort-yeast mixture of the first phase for slowing of the yeast growth.

6. A continuous fermentation process, as claimed in claim 1, wherein oxygen-containing gas is introduced into the mixture of partially-fermented wort and yeast in the second phase to accelerate fermentation.

7. A continuous fermentation process, as claimed in claim 1, wherein gas selected from nitrogen and carbon dioxide is introduced into the mixture of partially-fermented wort and yeast in the second phase to retard fermentation.

8. A continuous fermentation process, as claimed in claim 1, comprising a further step of continuously removing yeast head, with a small content of partially-fermented wort, from the mixture of the second phase, separating said small wort content from said yeast head, and passing said separated wort to the third phase.

References Cited by the Examiner

UNITED STATES PATENTS

| 1,838,474 | 12/31 | Buswell et al. | 195—115 X |
| 2,054,736 | 9/36 | Boinot et al. | 195—37 X |
| 2,967,107 | 1/61 | Geiger et al. | 99—43 |

FOREIGN PATENTS

| 178,637 | 4/22 | Great Britain. |

OTHER REFERENCES

Wellhoener: Brauwelt, vol. 49, No. 44, pp. 624–626.

A. LOUIS MONACELL, *Primary Examiner.*